United States Patent
Watanabe et al.

(10) Patent No.: US 8,487,237 B2
(45) Date of Patent: Jul. 16, 2013

(54) ROTARY ENCODER AND METHOD OF ASSEMBLING THE SAME

(75) Inventors: Ikuo Watanabe, Yokohama (JP);
Masahiko Igaki, Yokohama (JP);
Chihiro Nagura, Yokohama (JP);
Hiraku Kozuka, Hiratsuka (JP); Satoru Hamasaki, Yamato (JP); Makoto Ogura, Sagamihara (JP); Tsutomu Nagao, Hirosaki (JP); Yasuji Yokoyama, Hirosaki (JP)

(73) Assignees: Canon Kabushiki Kaisha (JP); Canon Precision Inc. (JP)

( * ) Notice: Subject to any disclaimer, the term of this patent is extended or adjusted under 35 U.S.C. 154(b) by 193 days.

(21) Appl. No.: 13/050,471

(22) Filed: Mar. 17, 2011

(65) Prior Publication Data

US 2012/0049051 A1     Mar. 1, 2012

(30) Foreign Application Priority Data

Aug. 30, 2010  (JP) ................. 2010-192264
Jan. 15, 2011  (JP) ................. 2011-006510

(51) Int. Cl.
*G01D 5/347* (2006.01)
*G01D 5/36* (2006.01)

(52) U.S. Cl.
USPC ............. 250/231.16; 250/231.17; 356/617

(58) Field of Classification Search
USPC ............. 250/216, 231.1, 231.13–231.18, 250/237 R, 237 G; 356/614–619; 33/700, 33/706, 707
See application file for complete search history.

(56) References Cited

U.S. PATENT DOCUMENTS

| 4,567,467 A * | 1/1986 | Wiblin et al. ............ 341/13 |
| 7,282,699 B2 | 10/2007 | Atsuta et al. |
| 7,507,919 B2 * | 3/2009 | Sugahara et al. ........ 200/6 A |
| 2006/0192092 A1 | 8/2006 | Atsuta et al. |
| 2010/0171028 A1 | 7/2010 | Wong |
| 2012/0049051 A1 * | 3/2012 | Watanabe et al. ...... 250/231.17 |

FOREIGN PATENT DOCUMENTS

| EP | 1688711 A2 | 8/2006 |
| JP | 2006-214929 A | 8/2006 |

OTHER PUBLICATIONS

European Search Report issued in counterpart application No. 11158670.7, dated Dec. 19, 2011.

* cited by examiner

*Primary Examiner* — John Lee
(74) *Attorney, Agent, or Firm* — Rossi, Kimms & McDowell LLP

(57) ABSTRACT

Provided is a rotary encoder, including: a rotary scale, which has a predetermined pattern including continuous patterns and a rotational angle original point formed thereon with reference to a pattern center, has a polygonal outer shape, and has the rotational angle original point defined with reference to at least one side of sides of the polygonal outer shape; a hub, which includes projections for abutting the sides of the polygonal outer shape of the rotary scale and positioning the rotary scale; a rotating shaft, which is press-fitted into the hub and rotates coaxially with the pattern center of the rotary scale; and detecting units for irradiating the rotary scale with light and detecting the light reflected by the rotary scale.

10 Claims, 7 Drawing Sheets

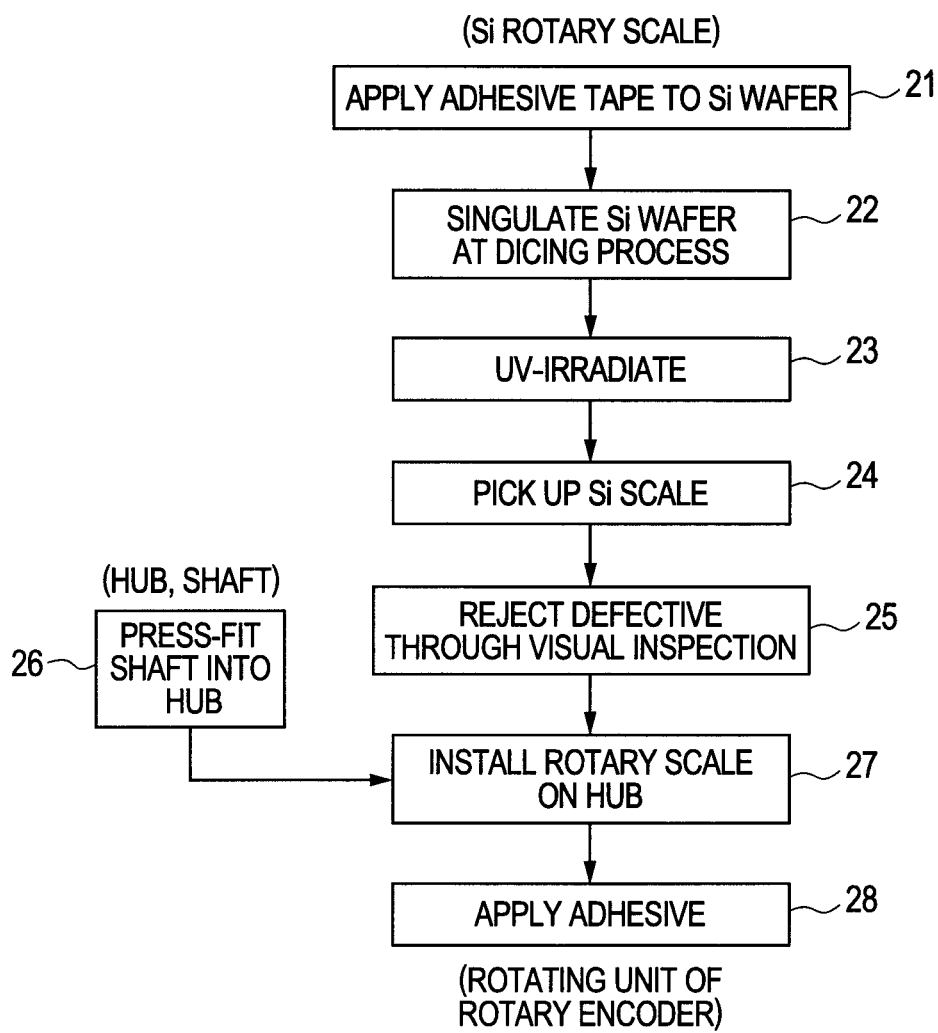

DEPRESSING IN Z AXIS DIRECTION

ROTARY ENCODER AND METHOD OF ASSEMBLING THE SAME

BACKGROUND OF THE INVENTION

1. Field of the Invention

The present invention relates to a rotary encoder for detecting rotation information such as a rotational speed and a rotational angle of an object to be detected, in particular a rotary encoder suitable for detecting a rotational angle original point of the object to be detected.

2. Description of the Related Art

As a rotary encoder, there is known an optical rotary encoder adapted for detecting absolute position information among rotation information about an object to be detected (Japanese Patent Application Laid-Open No. 2006-214929). For example, in a reflecting type rotary encoder, light emitted from a light emitting element such as an LED provided on a detecting head is reflected by a rotary scale, the returning light is received by a light detecting element such as a phototransistor, and lights and darks of the received light are counted, thereby measuring the rotation information about the rotary scale.

The rotary encoder of a type which detects an absolute position (position of an original point) is, in many cases, fabricated by aligning an original point of a rotational angle of the rotary scale with a predetermined position on a rotating body, for example a hub, and performing adjustment by visual inspection or the like. Similarly, a pattern center of the rotary scale and a rotation center of the hub also require a similar adjustment. In this case, centering is achieved by processing a hole and the pattern center of the scale with high accuracy so as to make a clearance relative to a fitting portion of the hub smaller and thus suppressing eccentricity.

As regards the reflecting type rotary encoder, in the rotary scale involving a function of detecting the position of the original point, reflecting portion patterns are radially arranged at regular intervals with respect to the pattern center. A part of those patterns is eliminated to provide a missing portion for detecting the position of the original point, which has no reflecting portion pattern. This missing portion is detected by a detecting head, thereby defining a rotational angle original point. However, because the rotary scale is disc-shaped and difficult to determine its mounting phase, there is a problem in that, in order to align the original point of the rotary scale with the hub with regard to the original point of the angular direction and to assemble the rotary scale and the hub, many hours for these processes are required. Further, there is a problem in that centering between the rotary scale and the hub also requires many hours or needs improvement for accuracy of an inner diameter of the rotary scale, which leads to prolonged production time.

SUMMARY OF THE INVENTION

In is an object of the present invention to provide a rotary encoder, which enables easy centering between a rotary scale and a hub, and further enables easy assembling of the rotary scale and the hub with high accuracy, and to provide a method of assembling the rotary encoder.

A rotary encoder according to one aspect of the present invention includes: a rotary scale, which has a predetermined pattern including continuous patterns and a rotational angle original point formed thereon with reference to a pattern center, has a polygonal outer shape, and has the rotational angle original point defined with reference to at least one side of sides of the polygonal outer shape; a hub, which includes projections for abutting the sides of the polygonal outer shape of the rotary scale and positioning the rotary scale; a rotating shaft, which is press-fitted into the hub and rotates coaxially with the pattern center of the rotary scale; and detecting units for irradiating the rotary scale with light and detecting the light reflected by the rotary scale.

Further, a rotary encoder according to another aspect of the present invention includes: a rotary scale, which has a predetermined pattern including continuous patterns formed thereon with reference to a pattern center, has a polygonal outer shape, and has a rotational angle phase of the continuous patterns defined with reference to at least one side of sides of the polygonal outer shape; a hub, which includes projections for abutting the sides of the polygonal outer shape of the rotary scale and positioning the rotary scale; a rotating shaft, which is press-fitted into the hub and rotates coaxially with the pattern center of the rotary scale; and detecting units for irradiating the rotary scale with light and detecting the light reflected by the rotary scale.

A method of assembling a rotary encoder according to the present invention, includes: forming a predetermined pattern on a wafer with reference to an orientation flat, the predetermined pattern including continuous patterns and a rotational angle original point with reference to a pattern center; cutting out a rotary scale to have a polygonal outer shape, the rotary scale having the rotational angle original point defined with reference to at least one side of sides of the polygonal outer shape; mounting the rotary scale cut out to a hub which rotates with the rotary scale, in such a manner that the rotary scale abuts projections for positioning provided on the hub; measuring a positional relationship between a rotating shaft, which is press-fitted into the hub and rotates coaxially with the pattern center of the rotary scale, and the projections; and determining dimensions of two sides of the polygonal outer shape of the rotary scale which abut the projections and cutting out the rotary scale from the wafer, with reference to the measured positional relationship.

According to the present invention, there may be obtained a rotary encoder, which enables easy centering between the rotary scale and the hub, and further enables easy assembling of the rotary scale and the hub with high accuracy, and a method of assembling the rotary encoder.

Further features of the present invention will become apparent from the following description of exemplary embodiments with reference to the attached drawings.

BRIEF DESCRIPTION OF THE DRAWINGS

FIG. 2 is a flow chart of assembling of the rotary encoder according to the first embodiment of the present invention.

DESCRIPTION OF THE EMBODIMENTS

Figure 1A:
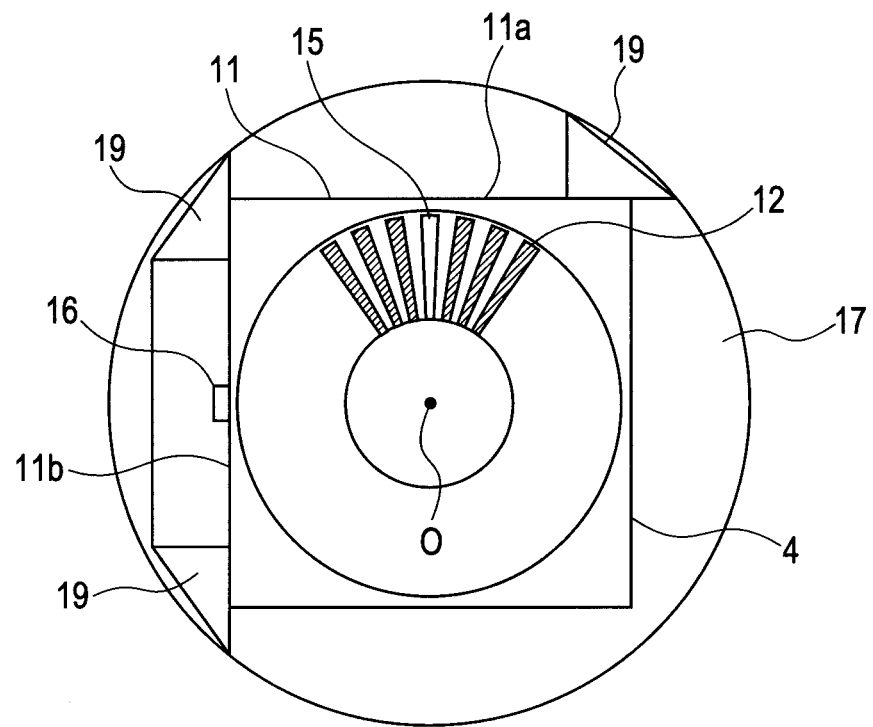
FIG. 1A is a main portion top view illustrating a rotating unit of a rotary encoder according to a first embodiment of the present invention.

Hereinafter, embodiments of the present invention are described in detail with reference to the drawings. A rotary encoder according to the present invention includes a rotary scale 4, which has a predetermined pattern including continuous patterns 12 and a discontinuous pattern (rotational angle original point) 15 formed thereon with reference to a pattern center (rotation center), and formed from a wafer, for example, a silicon wafer, to have a polygonal outer shape.

The rotary scale 4 is formed by being cut out from a wafer, for example, a silicon wafer. The rotational angle original point is defined with reference to at least one side 11a of sides of the polygonal outer shape of the rotary scale. The rotary encoder includes a hub 17, which includes projections 19 for abutting at least two sides, for example, two sides which are nonparallel to each other, of the outer shape of the rotary scale 4 and positioning the rotary scale 4, and which further rotates coaxially with the rotary scale 4. The rotary encoder includes a rotating shaft 18, which is press-fitted into the hub 17 and fits with an object to be detected (rotating object) whose rotation information is to be detected. The rotary encoder also includes a detecting unit, including a light source for irradiating the rotary scale 4 with light and a light receiver for detecting the light reflected by the rotary scale. The rotating shaft 18 has, on a side to which the object to be detected is fitted, a groove 20 for definition of a rotation phase with respect to the rotational angle original point of the rotary scale.

Figure 1B:
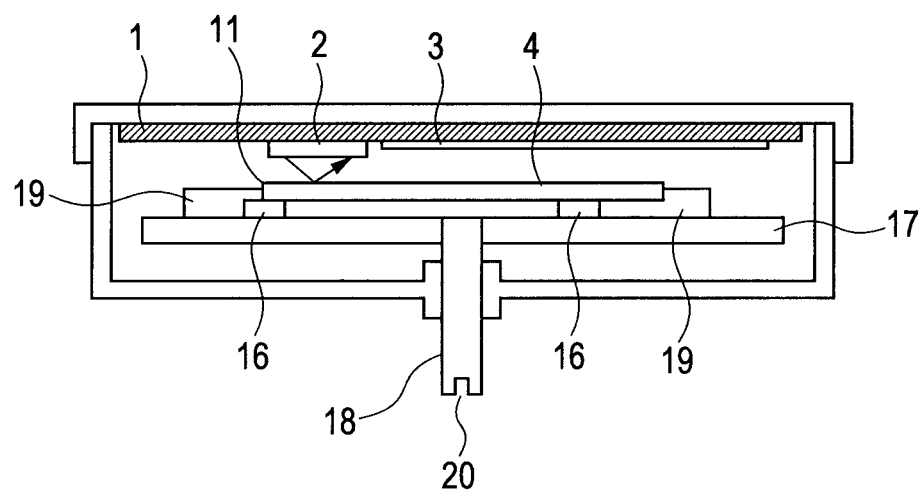
FIG. 1B is a partial side sectional view illustrating the rotary encoder according to the first embodiment of the present invention.

FIGS. 1A and 1B are a main portion top view and a partial side sectional view, respectively, illustrating a first embodiment of a rotating unit of the rotary encoder according to the present invention. In this embodiment, the rotary scale 4 has a square outer shape and is made of silicon (Si). The rotary scale 4 is of a reflecting type having silicon as a base material, using aluminum for a reflection film, and being fabricated by a semiconductor manufacturing process including deposition, exposure, etching, etc. The square rotary scale 4 is adhered to three projections 19 having taller height provided on the hub 17 as a rotating unit made of a resin under a state in which the rotary scale 4 is butted against and aligned with the three projections 19. The shaft (rotating shaft) 18 made of a metal is press-fitted into the hub 17.

The rotary scale 4 is provided with the continuous patterns 12 and the discontinuous portion (discontinuous pattern) 15, for detecting the rotation information. The discontinuous portion 15 indicates the rotational angle original point of the rotary scale 4 and is formed in the upper side of the rotary scale 4 in FIG. 1A. A tip of the shaft 18 is provided with the groove 20, which performs definition of a phase with and fits with the object to be detected (not shown). In this embodiment, a direction of the groove 20 is parallel to the discontinuous portion 15 which indicates the angle original point of the rotary scale 4 so that a rotational angle of the shaft relative to the rotary scale 4 of the hub 17 is defined.

Operations for detecting the rotation information about the object to be detected by the rotary encoder are described. A controller 3 and detecting unit (optical IC) 2 are mounted on a printed board 1. Light emitted from the light emitting element (light source) such as an LED of the detecting unit 2 is reflected by the rotary scale 4 and received by the light receiver of the detecting unit 2. Based on a change of a light receiving pattern from the receiver, the controller 3 executes an angle measurement by counting the number of rotations and detecting a direction of the rotation of the rotary scale 4. Details of those operations are disclosed in prior Japanese Patent Application Laid-Open No. 2006-214929.

In other words, the rotary scale 4 of the reflecting type rotary encoder according to this embodiment rotates about the rotation center O, and the continuous patterns 12 are radially arranged at regular intervals. First and second detecting units 2a, 2b for detecting reflected light from the rotary scale 4 to obtain position information about the rotary scale 4 are disposed with a mutual angular position difference of 180 degrees with respect to the rotary scale 4. The rotational angle original point 15 as the discontinuous pattern is formed instead of a part of the continuous patterns 12 of the rotary scale 4. The original point is determined by detecting the rotational angle original point 15.

The rotational angle original point 15 as the discontinuous pattern is formed by, for example, eliminating one of the continuous patterns 12, or eliminating a few consecutive patterns. The first and second detecting units 2a, 2b are similarly configured, and each of which has multiple light receiving sensors for detecting different rotary encoder signals, that is, signals having A-phase, B-phase, A'-phase, and B'-phase, the sensors being arranged, for example, in sets each including four light receiving sensors. By detecting unbalance in output signals when the rotational angle original point 15 passes the first detecting unit 2a, the first detecting unit 2a detects the rotational angle original point 15, and based on the detection, the original point is determined.

Note that, in the rotary encoder according to this embodiment, the rotary scale 4 may include only the continuous patterns 12, and does not need to include the discontinuous pattern (rotational angle original point) 15.

The rotary scale 4 of the rotary encoder according to this embodiment has a predetermined pattern including the continuous patterns 12 formed thereon with reference to the pattern center. The rotary scale 4 may be made of the silicon wafer, have the polygonal outer shape, and have a rotational angle phase of the continuous patterns 12 defined with reference to the at least one side 11a of the sides of the polygonal outer shape.

The hub 17 includes projections 16, 19 for abutting at least two sides 11a, 11b of the outer shape of the rotary scale 4 and positioning the rotary scale 4. The rotating shaft 18 is press-fitted into the hub 17 and rotates coaxially with the pattern center of the rotary scale 4. The detecting unit 2 irradiates the rotary scale 4 with light and detects the light reflected by the rotary scale 4.

Further, as another embodiment, the rotating shaft 18 is press-fitted into the hub 17, which rotates with the rotary scale 4. The rotating shaft 18 fits with the object to be detected whose rotation information is to be detected and rotates coaxially with the rotary scale 4. The detecting unit 2 irradiates the rotary scale 4 with light and detects the light reflected by the rotary scale 4.

Figure 7:
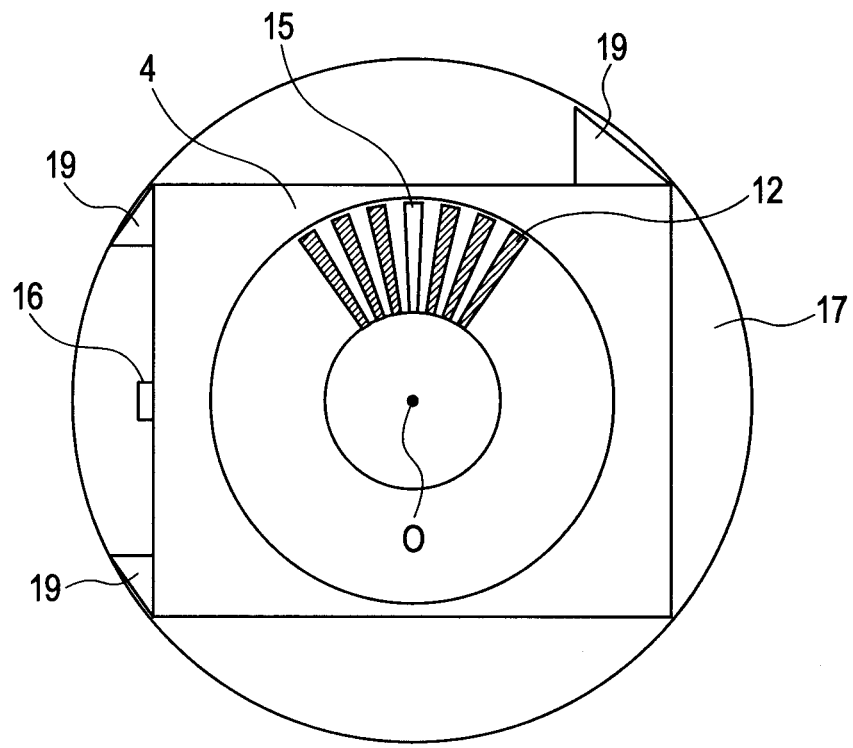
FIG. 7 is a view illustrating a rotating unit of a rotary encoder according to a second embodiment of the present invention.

FIG. 7 is a main portion explanatory diagram illustrating a second embodiment of a rotating unit of a rotary encoder according to the present invention. The basic configuration and behavior of the second embodiment are identical to those of the first embodiment. According to this embodiment, the rotary scale 4 has a rectangular (oblong) outer shape. The projections 19 having taller height among all projections are matched in position to the shape of the rotary scale 4, but the configuration is otherwise the same as that of the first embodiment.

Figure 8:
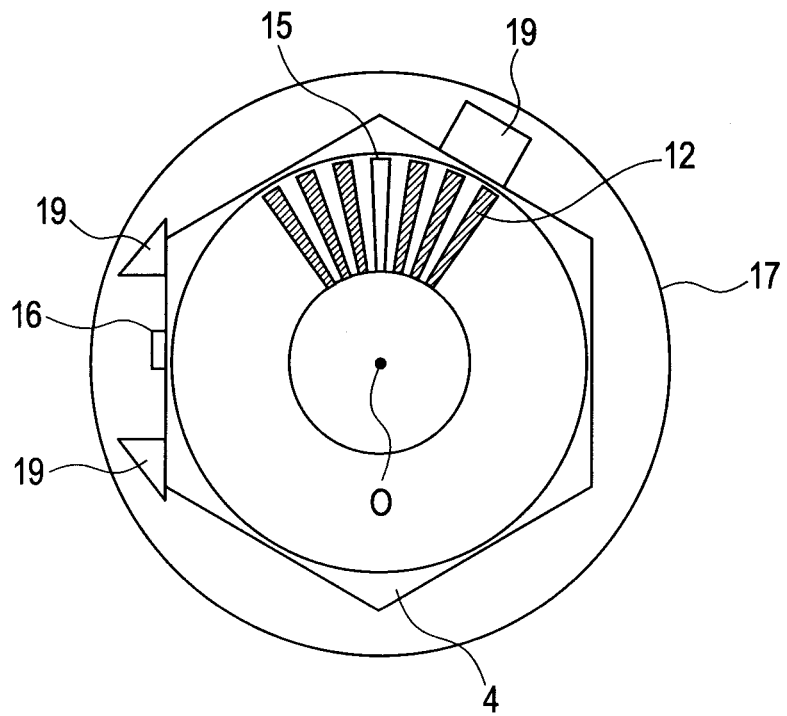
FIG. 8 is a view illustrating a rotating unit of a rotary encoder according to a third embodiment of the present invention.

FIG. 8 is a main portion explanatory diagram illustrating a third embodiment of a rotating unit of a rotary encoder according to the present invention. The basic configuration and behavior of the third embodiment are identical to those of the first embodiment. According to this embodiment, the rotary scale 4 has a hexagonal outer shape. The projection 16 having shorter height and the projections 19 having taller height are matched in position and shape to the outer shape of the rotary scale 4, but the configuration is otherwise the same as that of the first embodiment. In the case that the outer shape is regular hexagon, the hub 17 may advantageously be made smaller in outer shape compared to the square.

Hereinafter, a method of assembling a rotary encoder according to a fourth embodiment of the present invention is described. The method of assembling the rotary encoder of the present invention is performed with reference to an orientation flat 32 of the silicon wafer 31. The predetermined pattern including the continuous patterns 12 and the discontinuous pattern (rotational angle original point) 15 is formed with reference to the pattern center (rotation center), and the rotary scale having a polygonal outer shape is cut out. The rotational angle original point is defined with reference to the at least one side 11a of the sides of the polygonal outer shape. The rotary scale 4 thus cut out is mounted to the hub 17, which is to rotate coaxially with the rotary scale 4, in such a manner that the rotary scale 4 abuts the projections 19 for positioning provided on the hub 17, so as to assemble the rotary encoder.

Position information (positional relationship) is measured among two sides 11a, 11b of the outer shape of the rotary scale 4 which abut the projections 19, the projections 19, and a rotating shaft 18 which is press-fitted into the hub 17 and fits with the object to be detected whose rotation information is to be detected. Then, the rotary scale 4 is cut out from the silicon wafer with reference to the measured position information. Here, the two sides 11a, 11b are nonparallel to each other.

Hereinafter, the method of assembling the rotary encoder according to this embodiment is described with reference to a flow chart of FIG. 2 and explanatory diagrams of FIGS. 3 to 6. In a tape application process 21, a silicon wafer having multiple rotary scales fabricated thereon by a semiconductor process is placed on an adhesive tape larger than the scale size. In a dicing process 22, the wafer is diced (singulated) by a dicer so as to be divided and cut into individual rotary scale made of silicon. The dicing process 22 is controlled to separate the rotary scales made of silicon and keep the adhesive tape unseparated.

Here, a dicing position is determined accurately in distance from the center of toroidal scale patterns, and the rotary scales are diced with high accuracy. Thereby, the rotary scale is precisely processed so that the distances from two sides of the rotary scale 4, which are orthogonal to each other, to the pattern center have a accuracy of, for example, ±10 μm. In a UV irradiation process (ultraviolet irradiation process) 23, an ultraviolet (UV) irradiation is performed from the rear face so as to decrease an adhesive strength of the adhesive tape. Then, in a pick-up process 24, the scales are picked up by tweezers. Here, it is common to apply a tension to the adhesive tape in order to enable easy release of the rotary scale 4 from the adhesive tape. In a visual inspection process 25, a presence of any defect on the front and rear faces of the scale picked up is visually inspected using a stereoscopic microscope so as to eliminate any defective piece.

Figure 3:
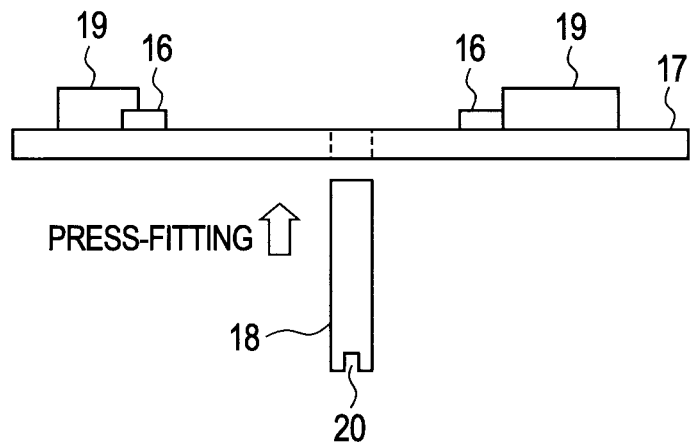
FIG. 3 is a view illustrating a step 26 of the assembling flow chart.

Hereinafter, in conjunction with the processes 21 to 25, a hub press-fitting process 26 is performed. In the hub press-fitting process 26, as illustrated in FIG. 3, the shaft (rotating shaft) 18 is perpendicularly press-fitted into the hub 17. Next, in an installation process 27 for installing the rotary scale 4 on the hub 17, a fast curable adhesive 29 is applied to the central portion of the hub 17.

Figure 4:
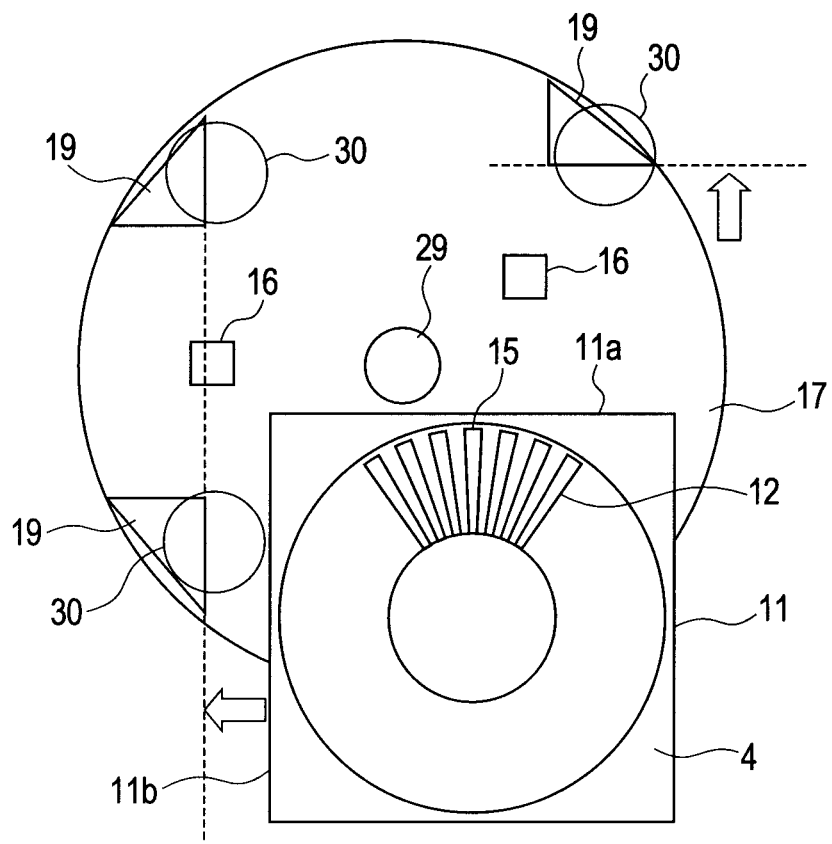
FIG. 4 is a plan view illustrating a step 27 of the assembling flow chart.
Figure 5:
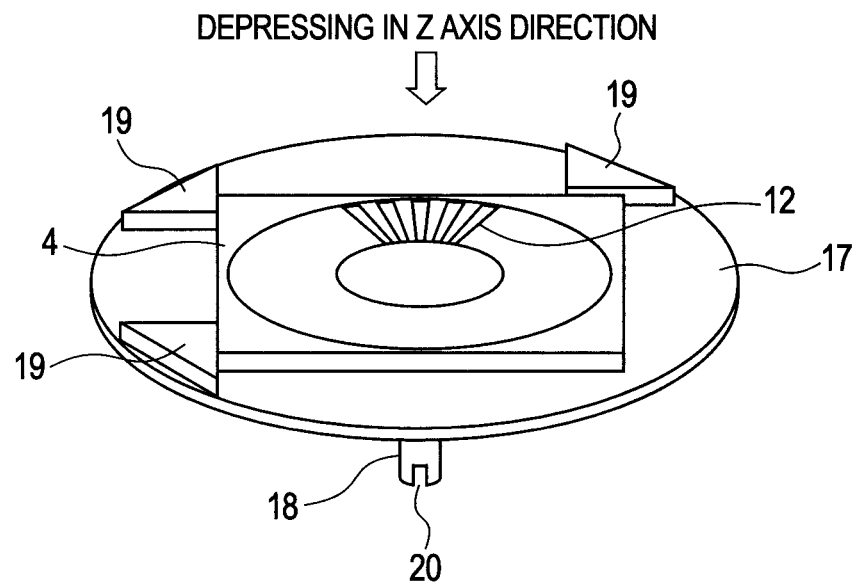
FIG. 5 is a perspective view illustrating the step 27 of the assembling flow chart.

As illustrated in FIG. 4, the installation is performed in such a manner that the two sides 11a, 11b of the rotary scale 4 abut three projections 19 having taller height of the hub 17. As further illustrated in FIG. 5, the installation is accurately performed in such a manner that the rotary scale 4 is depressed also in a Z-direction (direction of the rotating shaft 18), and abuts all the projections 16 having shorter height provided at three positions in the hub 17. Because the projections 16 are shorter in height than the projections 19, the two sides 11a, 11b of the rotary scale 4 placed on the projections 16 abut the projections 19.

Figure 6:
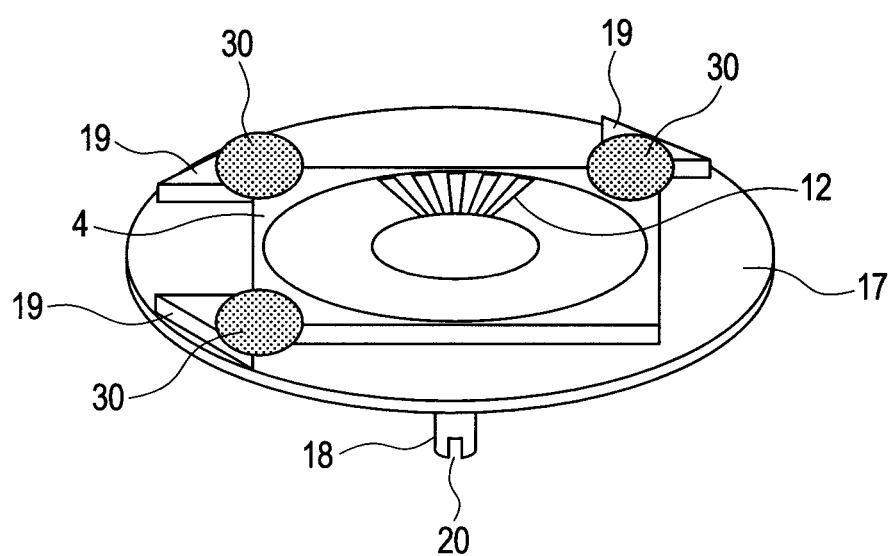
FIG. 6 is a perspective view illustrating a step 28 of the assembling flow chart.

In an adhesive application process 28, as illustrated in FIG. 6, a UV curable adhesive 30 is applied to contact portions between the projections 19 of the hub 17 and the rotary scale 4 so as to cover the contact portions, and then cured by UV light from a UV irradiation device. In the meantime, the fast curable adhesive 29 applied to the central portion of the hub 17 is also cured between the hub 17 and the rotary scale 4, as a result of which fixation is finished and the rotary encoder is completed.

Figure 9A:
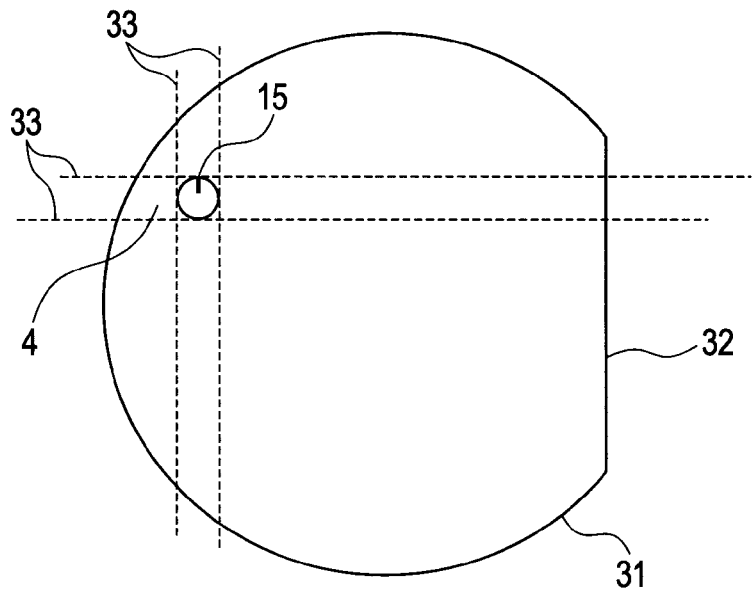
FIG. 9A is a view illustrating how to cut out, from a silicon wafer, a rotary scale of a rotary encoder according to a fourth embodiment of the present invention.
Figure 9B:
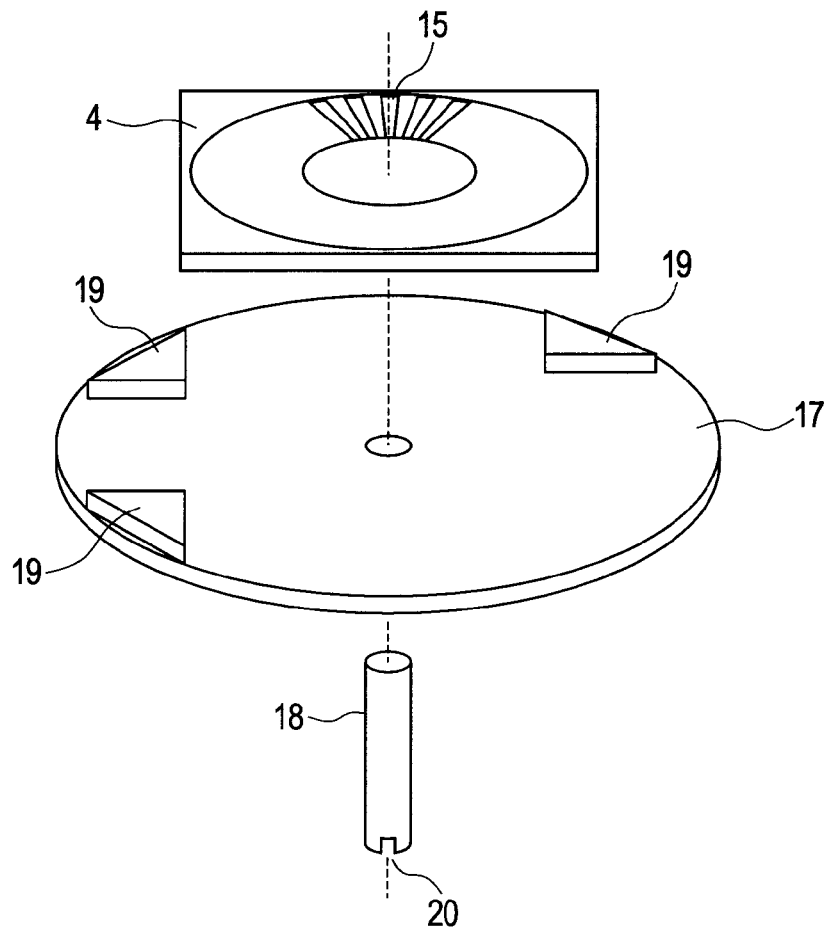
FIG. 9B is a perspective view illustrating a configuration of a rotating unit of the rotary encoder according to the fourth embodiment of the present invention.

FIGS. 9A and 9B are explanatory diagrams illustrating the method of assembling a rotary encoder according to a fourth embodiment of the present invention. In FIG. 9A, from a silicon wafer 31 having multiple reflecting type rotary scales 4 fabricated thereon, the rotary scales 4 are cut out by a dicing saw (not shown). Cutting lines 33 for the dicing saw are kept to be parallel or perpendicular to the orientation flat 32, and hence the discontinuous portion 15 as the original point of the rotary scale 4 illustrated in FIG. 9B is always located at the center of one side of cutting faces. The shaft 18 is press-fitted into the hub 17, under a state in which the groove 20 of the shaft 18 is aligned with a linear direction of a normal to one side of a scale installation surface defined by the three high projections 19 of the hub 17 passing through the original point.

Consequently, as disclosed in the first embodiment, the rotary scale 4 is installed and adhered on the hub 17. As a result, the rotary encoder having the groove 20 of the shaft 18 and the original point direction of the rotary scale 4 aligned with each other is completed. In other words, in this embodiment, the positional relationship is measured among the pattern center of the rotary scale 4, the rotating shaft 18, and the projections 19. Then, with reference to the measured positional relationship, dimensions of two sides of the outer shape of the rotary scale 4 which abut the projections 19 are determined to cut out the rotary scale 4 from the silicon wafer 31.

In a method of assembling a rotary encoder according to a fifth embodiment of the present invention, the positional relationship is measured between the rotating shaft 18 and the projections 19 for butting the rotary scale with respect to the shaft center of the hub 17. In this case, the rotary scale is offset in a direction to compensate a displacement amount thus determined, and subsequently the rotary scale is cut from a silicon wafer so as to assemble the rotary encoder.

Figure 10:
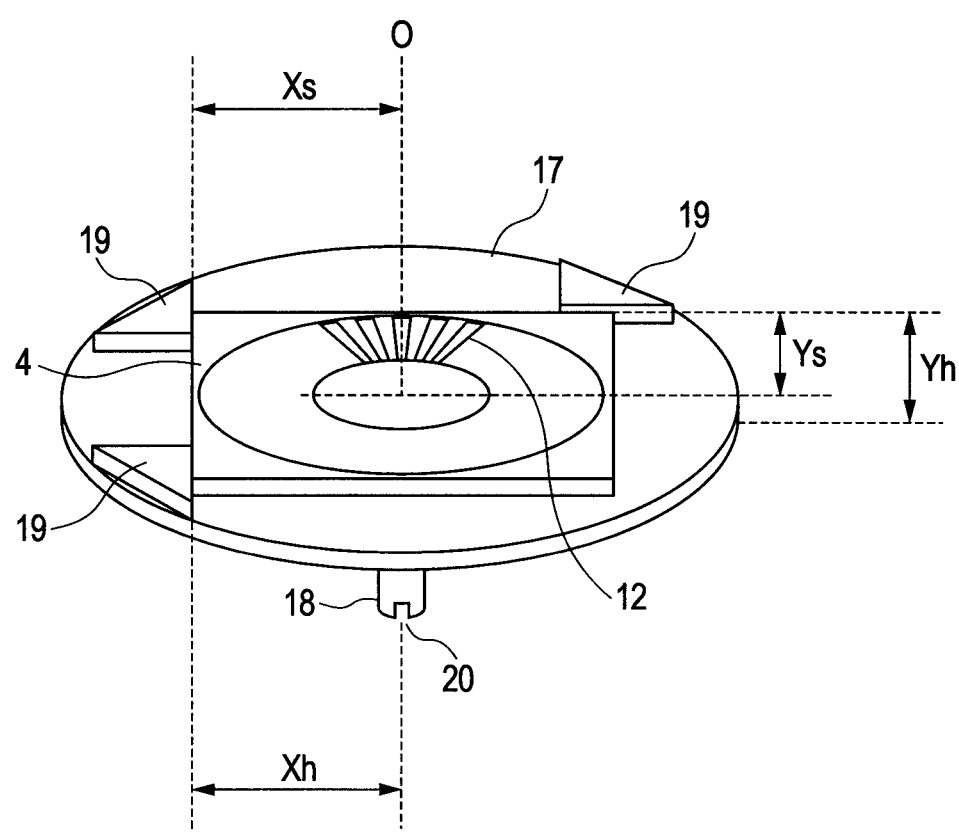
FIG. 10 is a perspective view illustrating a configuration of a rotating unit of a rotary encoder according to a fifth embodiment of the present invention.

FIG. 10 is an explanatory diagram illustrating the method of assembling the rotary encoder according to the fifth embodiment of the present invention. In FIG. 10, Xh denotes a distance between the center of the hub 17 and the butting portion of the projection 19 in an X-axis direction, and Yh denotes a distance between the center of the hub 17 and the butting portion of the projection 19 in a Y-axis direction. Xs denotes a distance between the center of the rotary scale 4 and the butting portion of the projection 19 in the X-axis direction, and Ys denotes a distance between the center of the rotary scale 4 and the butting portion of the projection 19 in the Y-axis direction. Without manufacturing errors, in the case of assuming that X, Y are design values from the centers of the hub 17 and the rotary scale 4 to the butting portion of the projection 19, the following formulae are satisfied.

$$Xh=Xs=X$$

$$Yh=Ys=Y$$

However, the hub 17, which is a molded component, generally has some errors. Thus, in the cutting process in the dicing saw, the manufacturing error of the hub 17 may be cancelled if the dicing saw is set out as following.

$$Xs=Xh \neq X$$

$$Ys=Yh \neq Y$$

By employing this manufacturing method, the need for remaking or trimming a mold for manufacturing the hub 17 is eliminated, and thus reduction in the number of hours and cost may be achieved.

As indicated above, according to each of the embodiments, the rotary scale having the polygonal outer shape may be used for easily performing the definition of angle and centering during assemblage. Moreover, the need for processing and grinding the outer shape of the rotary scale, which is made of such as glass, in a circular shape is eliminated, and thus easy manufacture of the rotary encoder is achieved.

Further, in the method of assembling the rotary encoder according to the present invention, the rotating shaft, which has directionality, is press-fitted and fixed into the hub, on which the rotary scale having patterns is mounted and which rotates coaxially with the rotary scale. By using the hub requiring a positioning relative to the rotating shaft and the orientation flat or a notch of the silicon wafer, and with reference to the rotating shaft, each component may be assembled into the rotary encoder based on a consistent assembling reference. Note that, although the rotary encoder of the reflecting type is employed in this embodiment, a transmission type may be employed and the detecting unit (optical IC) 2 may have the light receiver and the light emitting portion separate from each other. Further, as regards the rotary scale, even in a case of a scale made of glass widely used in encoders, a similar effect is obtained by making the scale polygonal in shape.

As described above, when the rotary scale and the method of assembling the same according to the present invention are employed, it is possible to easily realize a definition of rotation angle of the rotary scale of the rotary encoder and to easily manufacture the rotary encoder.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-192264 filed Aug. 30, 2010 and No. 2011-006510 filed Jan. 15, 2011, which are hereby incorporated by reference herein in its entirety.

What is claimed is:

1. A rotary encoder, comprising:
a rotary scale, which has a predetermined pattern including continuous patterns and a rotational angle original point formed thereon with reference to a pattern center, has a polygonal outer shape, and has the rotational angle original point defined with reference to at least one side of sides of the polygonal outer shape;
a hub, which includes projections for abutting the sides of the polygonal outer shape of the rotary scale and positioning the rotary scale;
a rotating shaft, which is press-fitted into the hub and rotates coaxially with the pattern center of the rotary scale; and
detecting units for irradiating the rotary scale with light and detecting the light reflected by the rotary scale.

2. A rotary encoder according to claim 1, wherein the rotating shaft has, on a side to which an object to be detected is fitted, a groove for definition of a rotation phase with respect to the rotational angle original point of the rotary scale.

3. A method of assembling a rotary encoder, comprising:
forming a predetermined pattern on a wafer with reference to an orientation flat, the predetermined pattern including continuous patterns and a rotational angle original point with reference to a pattern center;
cutting out a rotary scale to have a polygonal outer shape, the rotary scale having the rotational angle original point defined with reference to at least one side of sides of the polygonal outer shape;
mounting the rotary scale cut out to a hub which rotates with the rotary scale, in such a manner that the rotary scale abuts projections for positioning provided on the hub;
measuring a positional relationship between a rotating shaft, which is press-fitted into the hub and rotates coaxially with the pattern center of the rotary scale, and the projections; and
determining dimensions of two sides of the polygonal outer shape of the rotary scale which abut the projections and cutting out the rotary scale from the wafer, with reference to the measured positional relationship.

4. A method of assembling a rotary encoder according to claim 3, wherein the rotating shaft has, on a side to which an object to be detected is fitted, a groove for definition of a rotation phase with respect to the rotational angle original point of the rotary scale.

5. A rotary encoder, comprising:
a rotary scale, which has a predetermined pattern including continuous patterns formed thereon with reference to a pattern center, has a polygonal outer shape, and has a rotational angle phase of the continuous patterns defined with reference to at least one side of sides of the polygonal outer shape;
a hub, which includes projections for abutting the sides of the polygonal outer shape of the rotary scale and positioning the rotary scale;
a rotating shaft, which is press-fitted into the hub and rotates coaxially with the pattern center of the rotary scale; and
detecting units for irradiating the rotary scale with light and detecting the light reflected by the rotary scale.

6. A rotary encoder, comprising:
a rotary scale, which has a polygonal outer shape, and has a plurality of repeat patterns arranged along a rotating direction of the rotary scale, and an angle reference point, wherein the angle reference point is defined with reference to at least one side of sides of the polygonal outer shape;

a hub, which includes projections abutting the sides of the polygonal outer shape of the rotary scale;

a rotating shaft, which rotates coaxially with the rotary scale; and detecting units for irradiating the rotary scale with light and detecting the light reflected by the rotary scale.

7. A rotary encoder according to claim 6, wherein the rotating shaft has, on a side to which an object to be detected is fitted, a groove for definition of a rotation phase with respect to the angle original point of the rotary scale.

8. A method of assembling a rotary encoder, comprising:

forming a predetermined pattern on a wafer with reference to an orientation flat, the predetermined pattern including repeat patterns and an angle reference point;

cutting out a rotary scale to have a polygonal outer shape, the rotary scale having the angle reference point defined with reference to at least one side of sides of the polygonal outer shape;

mounting the rotary scale cut out to a hub which rotates with the rotary scale, in such a manner that the rotary scale abuts projections provided on the hub;

measuring a positional relationship between a rotating shaft, which rotates coaxially with the rotary scale, and the projections; and determining dimensions of two sides of the polygonal outer shape of the rotary scale which abut the projections and cutting out the rotary scale from the wafer, with reference to the measured positional relationship.

9. A method of assembling a rotary encoder according to claim 8, wherein the rotating shaft has, on a side to which an object to be detected is fitted, a groove for definition of a rotation phase with respect to the rotational angle original point of the rotary scale.

10. A rotary encoder, comprising:

a rotary scale, which has a polygonal outer shape, and has a plurality of repeat patterns arranged along a rotating direction of the rotary scale, a rotational angle phase of the continuous patterns, wherein the rotational angle phase is defined with reference to at least one side of sides of the polygonal outer shape;

a hub, which includes projections for abutting the sides of the polygonal outer shape of the rotary scale;

a rotating shaft, which rotates coaxially with the rotary scale; and detecting units for irradiating the rotary scale with light and detecting the light reflected by the rotary scale.

\* \* \* \* \*